United States Patent [19]
Pickard

[11] Patent Number: 6,123,492
[45] Date of Patent: Sep. 26, 2000

[54] FASTENING DEVICES

[75] Inventor: Neil Robert Pickard, Halifax, United Kingdom

[73] Assignee: Plastic Cores Limited, Halifax, United Kingdom

[21] Appl. No.: 09/117,187

[22] PCT Filed: Jan. 28, 1997

[86] PCT No.: PCT/GB97/00247

§ 371 Date: Apr. 26, 1999

§ 102(e) Date: Apr. 26, 1999

[87] PCT Pub. No.: WO97/28377

PCT Pub. Date: Aug. 7, 1997

[30] Foreign Application Priority Data

Jan. 30, 1996 [GB] United Kingdom .................... 9602190
Jun. 13, 1996 [GB] United Kingdom .................... 9612432

[51] Int. Cl.[7] .................................................. F16B 19/00
[52] U.S. Cl. ............................................ 411/508; 411/339
[58] Field of Search ................................. 411/508, 509, 411/510, 338, 339

[56] References Cited

U.S. PATENT DOCUMENTS

| | | | |
|---|---|---|---|
| 1,056,452 | 3/1913 | Remhilt | 411/338 |
| 2,981,995 | 5/1961 | Golubics | 411/338 |
| 3,115,804 | 12/1963 | Johnson | 411/339 X |
| 4,128,253 | 12/1978 | Powers | 280/79.1 A |
| 4,670,136 | 6/1987 | Schmidt et al. | 411/339 X |
| 4,761,860 | 8/1988 | Krauss | 411/339 X |
| 4,871,329 | 10/1989 | Van Der Meer | 411/339 X |
| 5,226,769 | 7/1993 | Negre et al. | 411/339 X |
| 5,247,549 | 9/1993 | Cearly et al. | 411/339 X |
| 5,254,016 | 10/1993 | Ganthier | 411/339 X |
| 5,366,332 | 11/1994 | Murphy | 411/509 |
| 5,522,635 | 6/1996 | Downey | 411/339 X |
| 5,829,910 | 11/1998 | Kameyama | 411/508 X |
| 5,842,822 | 12/1998 | Everett et al. | 411/339 |
| 5,975,820 | 11/1999 | Kirchen | 411/339 |

FOREIGN PATENT DOCUMENTS

| | | |
|---|---|---|
| 619394 | 5/1961 | Canada . |
| 467295 | 1/1992 | European Pat. Off. ............... 411/339 |
| 2081315 | 3/1970 | France . |
| 2172573 | 9/1986 | United Kingdom . |
| 2183711 | 6/1987 | United Kingdom . |
| 91/13810 | 9/1991 | WIPO . |

*Primary Examiner*—Suzanne Dino Barrett
*Attorney, Agent, or Firm*—Arent Fox Kintner Plotkin & Kahn PLLC

[57] ABSTRACT

A fastening device is provided to be inserted in an article to be fastened, the fastening device comprising a first member (10) having a shank (12) and an enlarged head (14), a second member (11) also having a shank (17) and an enlarged head (18), the shanks being respectively insertable into the hole in the article from opposite ends of the hole, the shanks being arranged to interengage with one another, such that the shanks are restrained against moving in the reverse direction, so that the article is held between the enlarged heads (14 and 18). The fastening device is particularly useful in constructing a plastics pallet.

18 Claims, 9 Drawing Sheets

FASTENING DEVICES

The invention relates to fastening devices and to uses therefor.

Many types of fastening devices are well known, including, for example, bolts with cooperating nuts, and rivets. Bolts and nuts are time consuming to screw together and tools are required. Fastening rivets also requires the use of tools and rivets cannot generally be subsequently removed without destroying the rivet, for example by drilling the rivet out of the hole into which it has been placed.

We have developed a fastening device which can be rapidly used without tools, and one embodiment of the device can be rapidly removed for re-use.

The invention provides a fastening device to be inserted in a hole in an article to be fastened, the fastening device comprising a first member having a shank and an enlarged head, a second member also having a shank and an enlarged head, the shanks being respectively insertable into the hole in the article from opposite ends of the hole, the shanks being arranged to interengage with one another, such that the shanks are restrained against moving in the reverse direction, so that the article is held between the enlarged heads.

The inter-engagement may comprise a ratchet arrangement.

Preferably there are teeth on the shanks which interengage with one another.

The teeth may be annular.

There may be a male shank and a female shank such that the male shanks slides within the female shank.

The male shank may be compressible radially inwardly to facilitate the sliding of the teeth of the male shank over the teeth of the female shank.

According to one embodiment, the male shank may be shaped such that it is readily compressible radially inwardly after the device has been fastened, to enable the two members to be separated again.

For example the male shank may have a conical nose so that pressure can be applied to the conical surface of the nose, for example by pushing a tube into the hole, the pressure on the conical surface bringing about a component of force which is directed radially inwards, thus compressing the male shank.

The male shank may be rendered radially inwardly compressible by forming the shank as a sleeve, the sleeve having at least one axially extending slot therein.

Preferably at least one of the heads is resiliently deformable in the axial direction so that the two members can be moved towards one another to reach a position in which compressive load is applied to the article by the fastening device.

For example, the head may be shaped such that at least the outer rim of the head can be flexed away from the article in the axial direction.

The article may comprise at least two components, each having a hole therethrough, which are to be secured together.

According to one embodiment, the article comprises a pallet.

The pallet may comprise a plurality of elongate slats secured together using fastening devices according to the invention.

The pallet may have upper and lower faces, spaced apart by separators, for example to enable the forks of a forklift truck to pass between the upper and lower faces.

The upper and lower faces may be secured to each other and to separators by fastening devices according to the invention of one size, the slats being secured to each other using fastening devices according to the invention having a smaller size.

The fastening devices may be made of plastics material.

The slats and separators of the pallet may also be made of plastics material.

By way of example, specific embodiments of the invention will now be described, with reference to the accompanying drawings, in which:

FIGS. 12 an 13 are views similar to FIGS. 8 and 9 but showing a further embodiment of male member;

The fastening device according to the first embodiment of the invention comprises a male member 10 and a female member 11.

Figure 1:
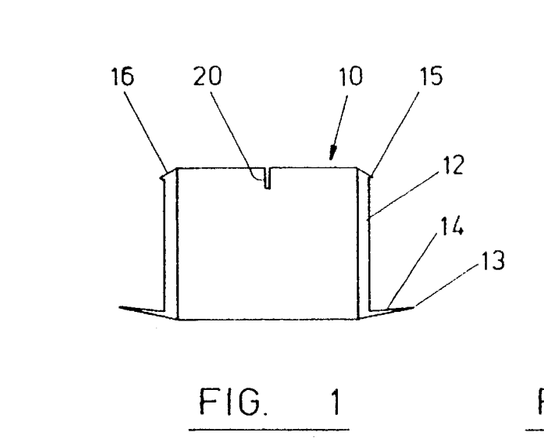
FIG. 1 is a transverse cross-sectional view through a male member of an embodiment of fastening device according to the invention.
Figure 2:
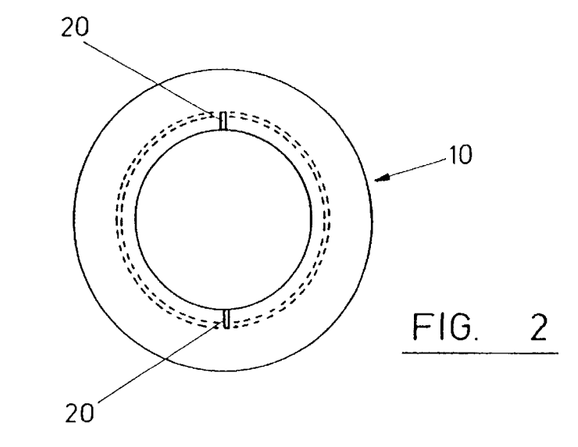
FIG. 2 is a plan view of the component shown in FIG. 1.

The male member has a shank 12 and an enlarged head 13. The underside 14 of the head 13 extends from the shank 12 at an angle of 85°.

The member is generally cylindrical and has one wedge shaped annular tooth 15 adjacent its leading edge. The face 16 of the leading edge is frustoconical.

Figures 3, 5:
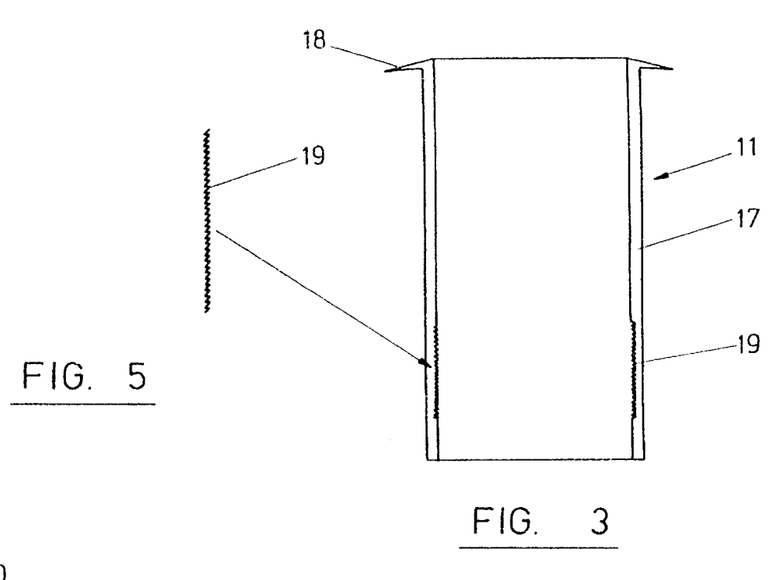
FIGS. 3 and 4 are views similar to FIGS. 1 and 2 but showing a female member of the fastening device.
FIG. 5 is a detail of FIG. 3 to an enlarged scale.
Figure 4:
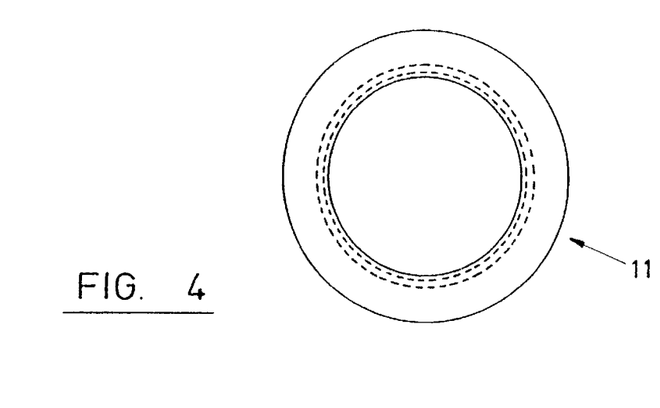

Female member 11 comprises a longer shank 17 having an enlarged head 18 which is identical to the head 13 of the male member.

The internal surface of part of the member 11 is provided with a plurality of annular wedge-shaped teeth 19.

The relative dimensions of the two members are such that the male member 10 can be pushed into the female member 11. The tooth 15 and teeth 19 are shaped such that the tooth 15 can snap over the teeth 19 as the two components move together, in a manner of a ratchet and pawl. If an attempt is made to pull the two members apart by simple axial pressure, the tooth faces which inter-engage extend in the radial direction and so such separating movement is resisted.

To facilitate the movement of the teeth over one another as the two members move together, two radially extending slots 20 are provided in the leading portion of the male member 10, so that the leading end of the male member is compressibly radially inwards.

The fastening device has been developed for use in securing together one or more components, for example the components of the pallet shown in FIGS. 6 and 7, which will be described later in more detail.

Although the teeth 15 and 19 are fairly fine, providing a number of different positions in which the two members can be locked together with respect to one another, the teeth are nevertheless provided at discreet intervals and so the movement of the members towards one another is incremental, and there could be situations in which the thickness of the components to be fastened is such that it lies between two tooth positions, in which case only a loose fit could be achieved.

To avoid this problem, and enable the fastening device to apply compressive load to the components being fastened, the 85° angle mentioned above is utilised. Because the heads 13 and 18 are angled in this manner, movement of the two members towards one another can be continued until the outer peripheral edges of the heads engage the components to be fastened. Movement to the next ratchet position will cause slight resilient deformation of the heads 13 and 18, bringing about the desired pressure.

The two members shown in FIGS. 1 to 5 are manufactured from plastics material, for example by injection moulding.

The plastics material may comprise polyethylene.

If it is desired to separate the members subsequently, the only step required is to push a sleeve member into the upper end of the female member 11 to apply pressure to the conical face 16. This compresses the male member radially inwardly again and enables the male member to be pushed back out of the female member.

Figure 6:
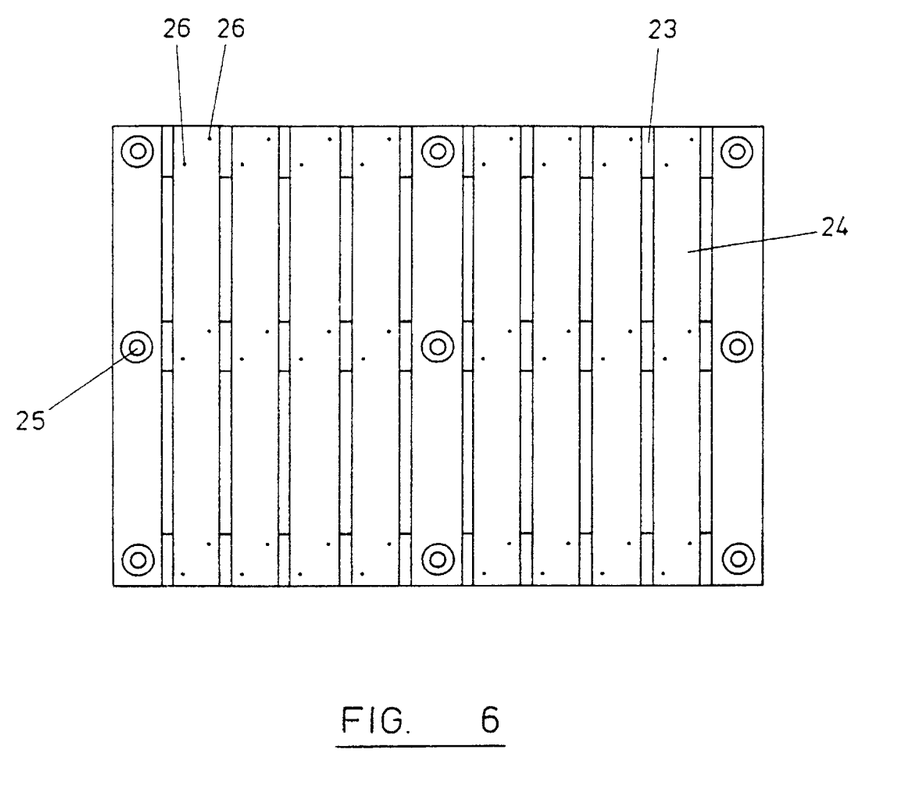
FIG. 6 is a plan view of a pallet according to an embodiment of the invention.
Figure 7:
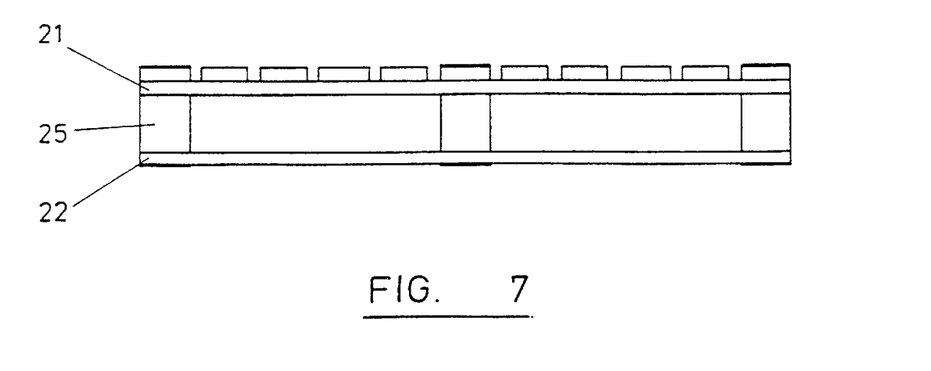
FIG. 7 is a side view of the pallet shown in FIG. 6.

An example of how the fastening device might be used, FIGS. 6 and 7 show a pallet having an upper face 21 and a lower face 22.

As can be seen from the plan view in FIG. 6, the upper face 21 comprises elongate slats 23 and 24, fastened together. The faces are separated by spacers in the form of cylindrical cores 25.

At the nine locations which register with the cores 25, the components are secured together by large diameter versions of the fastening device, which extend right through the pallet from the upper face to the lower face.

The holes which receive the fastening devices are arranged to be only fractionally larger than the fastening devices, and this close fit resists lateral movement.

To secure the slats together holes are drilled through the slats, for example at the locations indicated by reference numeral 26, and smaller diameter versions of the fastening devices are fitted into these holes.

The components of the pallet may also be of plastics material, for example polyethylene with a calcium carbonate filler to increase stiffness.

By utilising the fastening device of the invention, pallets such as that shown in FIGS. 6 and 7 can be supplied as a flat pack, for assembly by the user. The fastening devices can be inserted exceptionally rapidly, and without the use of tools, except possibly for the use of a mallet with the larger devices, where a swift tap may be used to ensure that the components of the fastening devices move sufficiently closely together to provide tight grip.

Alternative constructions and configurations are possible within the scope of the invention, and some or all of the components may for example be manufactured from metal or from a combination of materials.

In some applications it may be desirable to provide at least one of the members with a closed end, to provide a button-like finish rather than leaving an exposed aperture.

Figure 8:
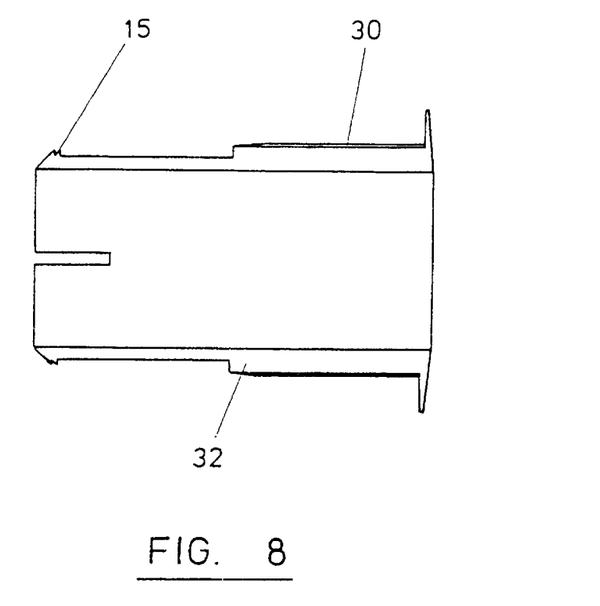
FIG. 8 is a cross sectional view through the male component of an alternative embodiment of fastening device according to the invention.
Figure 9:
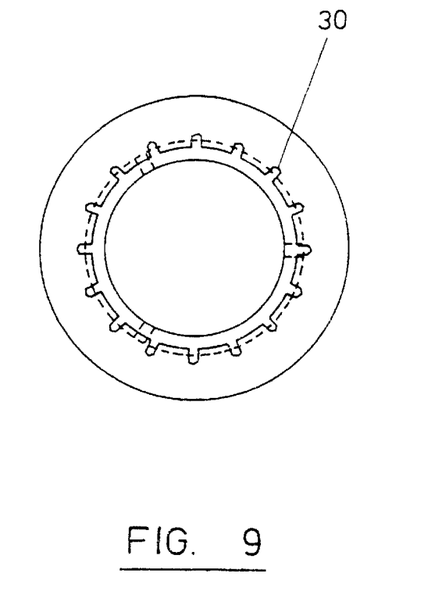
FIG. 9 is an end view of the component shown of FIG. 8.
Figure 10:
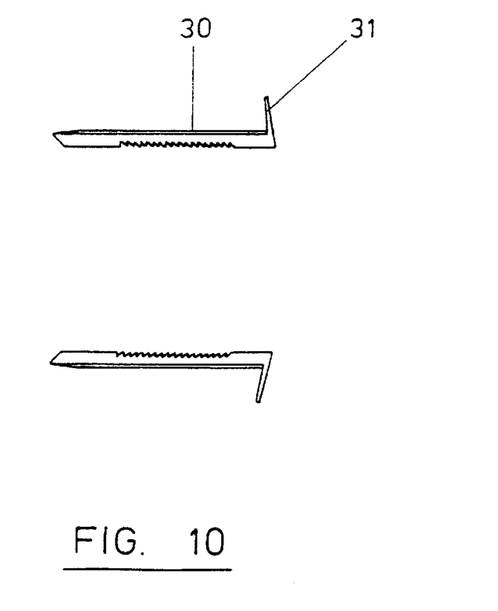
FIG. 10 is a cross sectional view through the female component for use with the component of FIG. 8.

Referring firstly to FIGS. 8 to 10, the two components shown in these figures operate in a similar manner to the components shown in FIGS. 1 to 5. There are however some differences as follows.

Firstly, the male component is provided with two teeth 15, rather than one. Secondly, both the male and female components are provided with longitudinal ribs 30 so that the components are a press fit in the apertures in components to be secured together by the fastening device. This ensures that the components are secured together firmly, without any play between the components.

Figure 11:
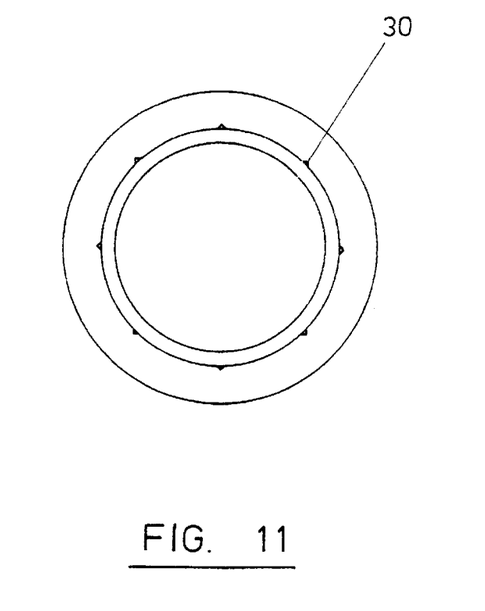
FIG. 11 is and end view of the component shown in FIG. 10.

Thirdly, only the head 31 of the female component is angled. This facilitates the moulding of the male component.

Finally, a shoulder 32 is provided on the male component. This ensures that when the two components are assembled together, the external surface of the male component is substantially flush in the radial direction with the external surface of the female component, which again ensures a snug fit of the whole fastening device within the hole of the components to be connected.

Figure 17:
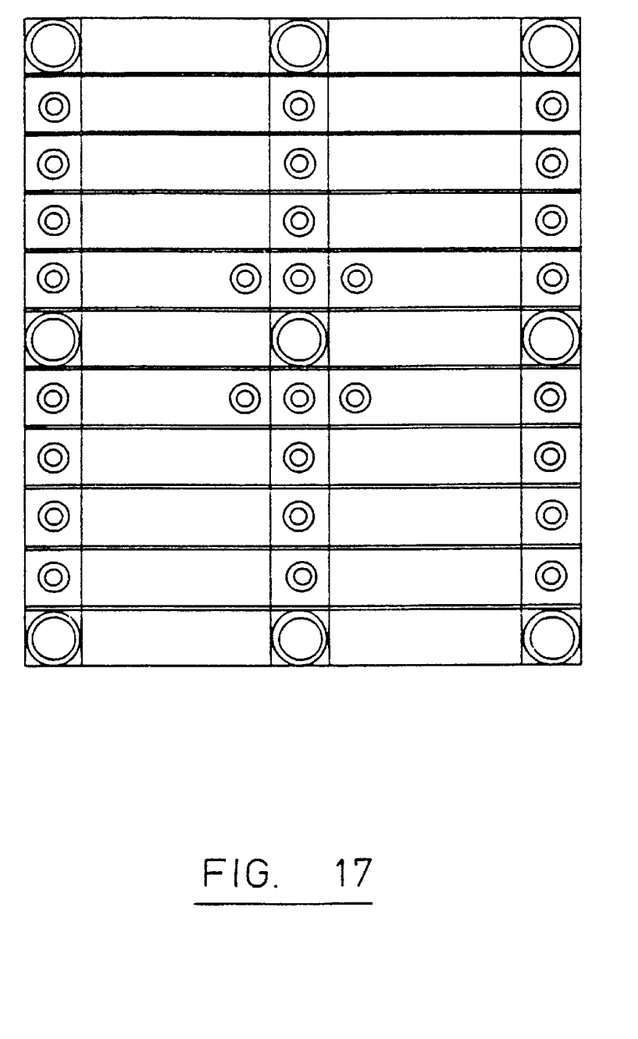
FIGS. 17 and 18 are views similar to FIGS. 6 and 7, showing a pallet assembled with fastening devices according to the invention.
Figure 18:
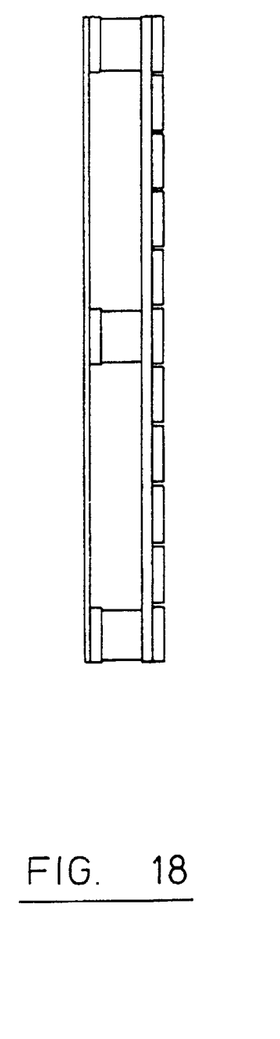

The fastening device shown in FIGS. 8 to 11 is of relatively large size, for use at main connection points such as the corners of the pallet shown in FIGS. 17 and 18, and at other main load bearing locations as shown in the Figures.

FIGS. 12 to 15 show a fastening device as slightly smaller dimensions, for example for use at other points on the pallet shown in FIGS. 17 and 18.

Figures 12, 13:
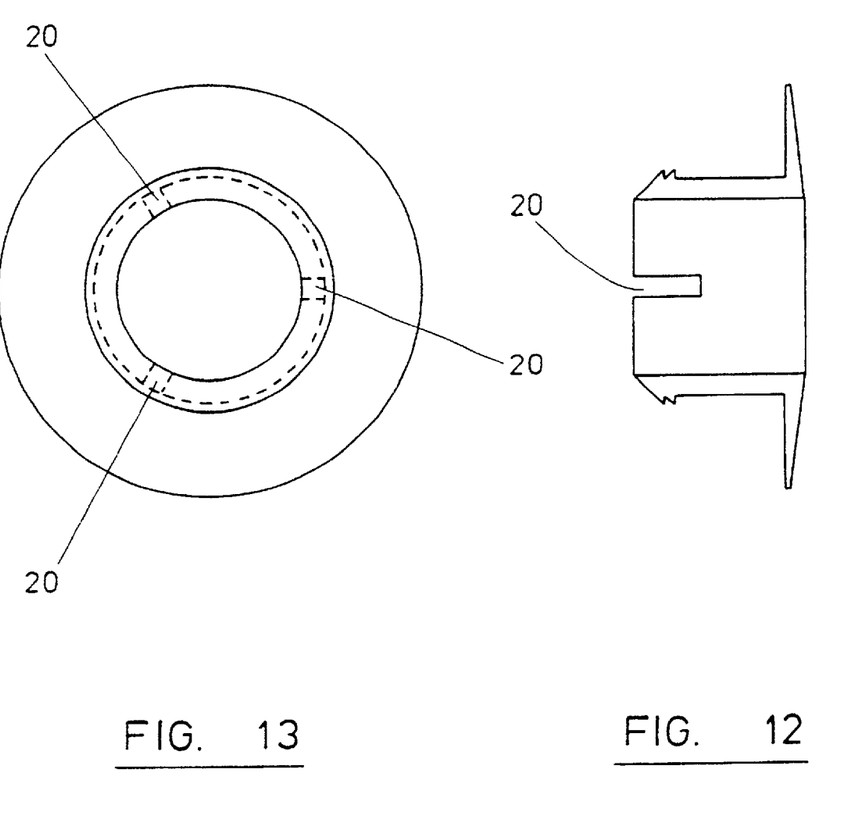
Figure 14:
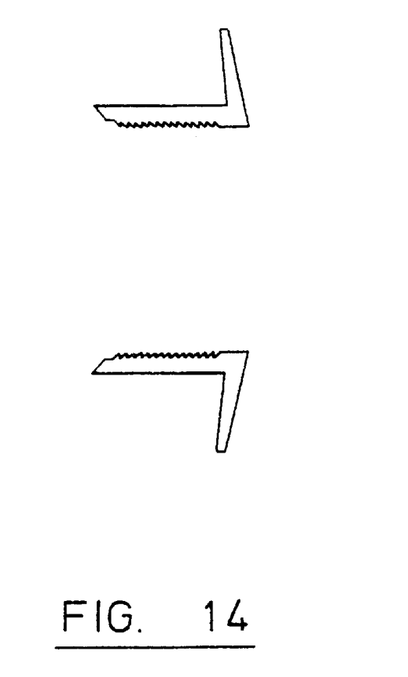
FIGS. 14 and 15 are cross sectional and side views of a female component for use with the male component of FIGS. 12 and 13.
Figure 15:
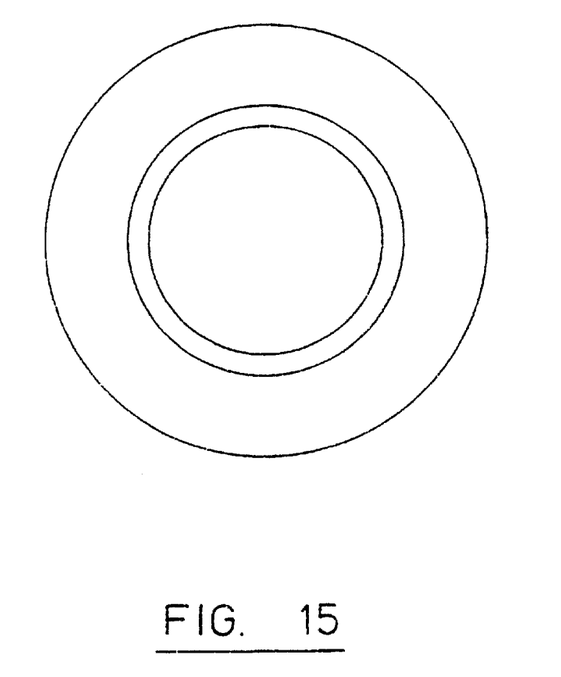

In addition to being of smaller dimensions, the male component shown in FIGS. 12 and 13 has three grooves 20 to facilitate flexing.

Figure 16:
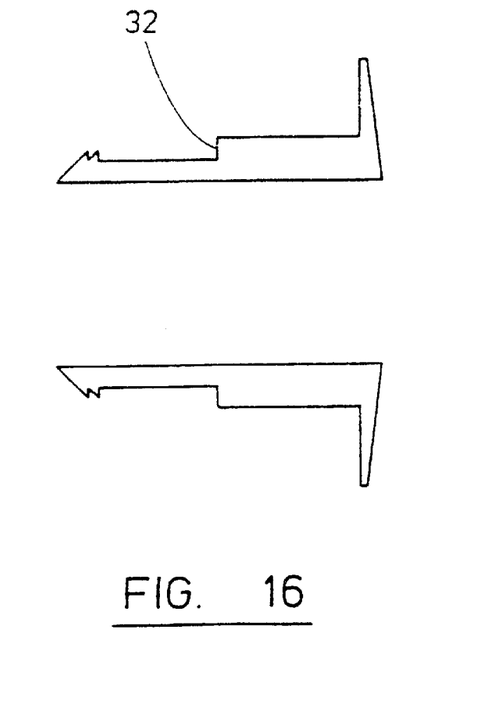
FIG. 16 is a view similar to FIG. 12, but showing an extended version of this male component.

The male component shown in FIGS. 12 and 13 is a relatively short component without a shoulder, but depending on the thickness of the components to be connected, a longer version may be used, such as the version shown in FIG. 16, which has a shoulder 32.

Figure 19:
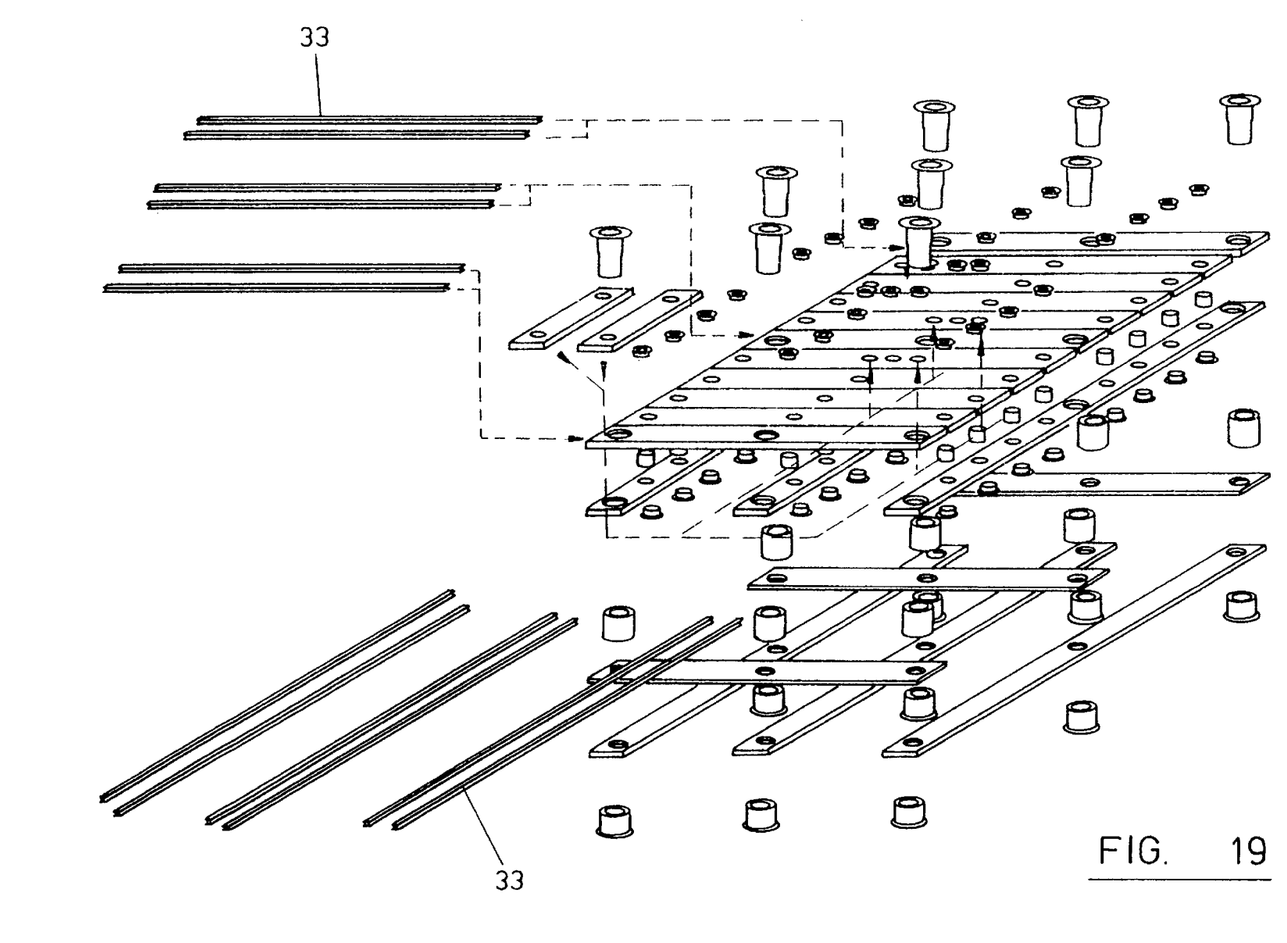
FIG. 19 is an exploded view of the pallet shown in FIGS. 17 and 18.

The pallet shown in FIGS. 17 to 19 is assembled in a similar manner to the pallet shown in FIGS. 6 and 7 of our earlier application. The main bearing slats may be moulded as hollow members, into which eye section metal bars 33 may be fitted, to increase the strength and rigidity of the main bearing slats.

Figure 20:
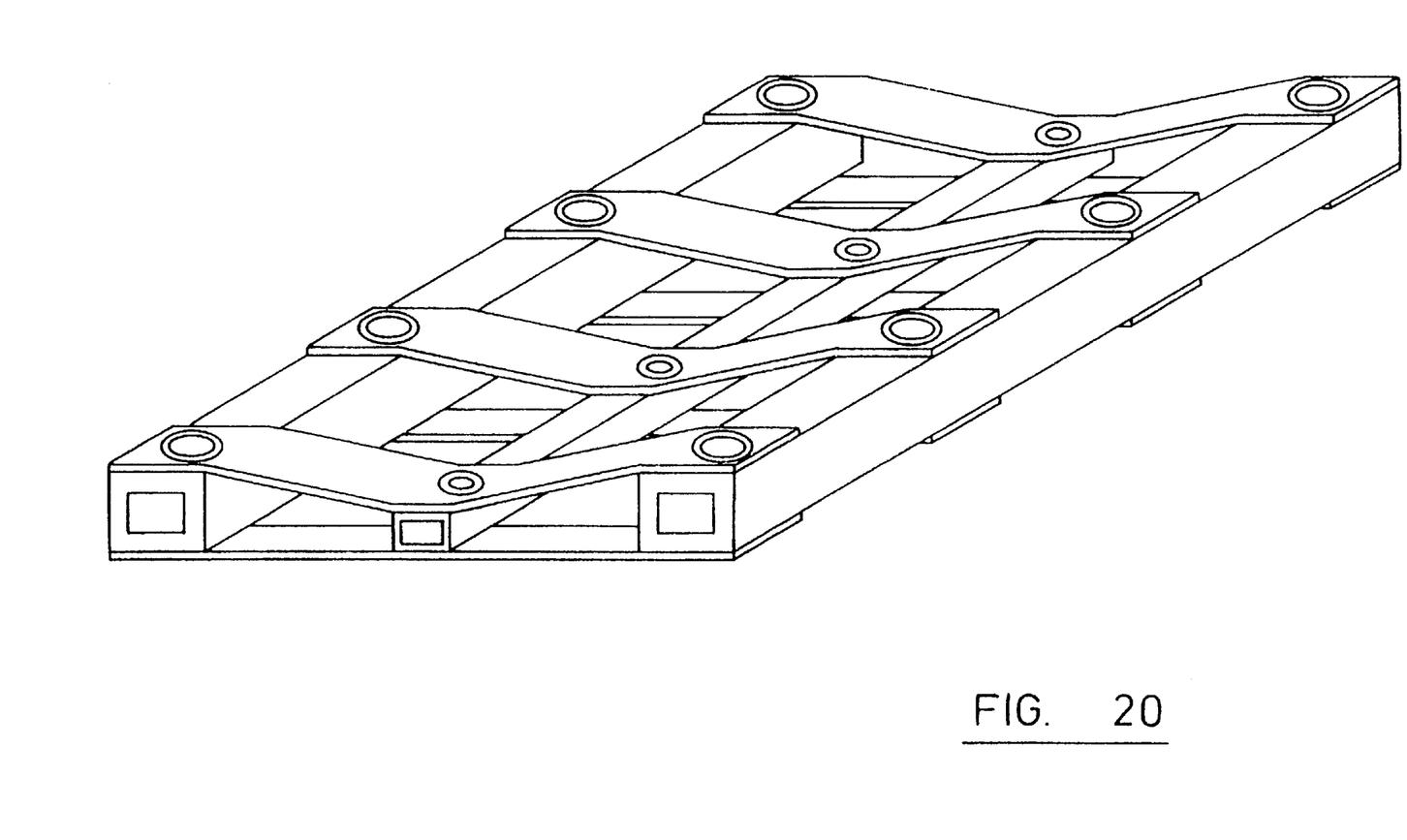
FIG. 20 is a perspective view of an alternative embodiment of pallet according to the invention.

Although the pallets described so far have substantially planar surfaces, pallets of any desired shapes may be constructed using the fastening devices of the invention, and FIG. 20 shows a cradle pallet as one example.

Figure 21:
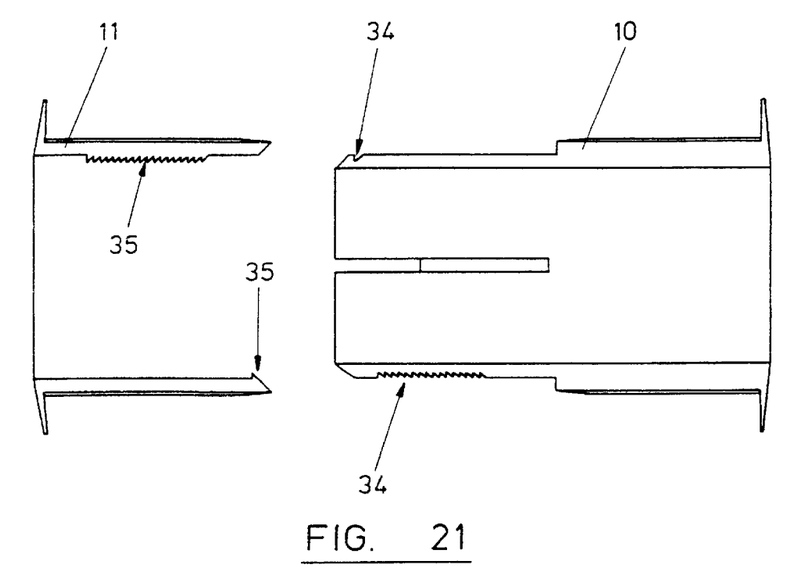
FIGS. 21 and 22 are cross-sectional views illustrating yet more embodiments of fastening device according to the invention.

FIG. 21 shows a further possible embodiment of fastening device according to the invention, in which the male member 10 is provided with one or more grooves 34 and the female member 11 is provided with one or more teeth 35.

The upper part of the figure shows one groove 34 and multiple teeth 35 but any combination is possible and the lower part of the figure shows, for example, multiple grooves 34 and one tooth 35.

Figure 22:
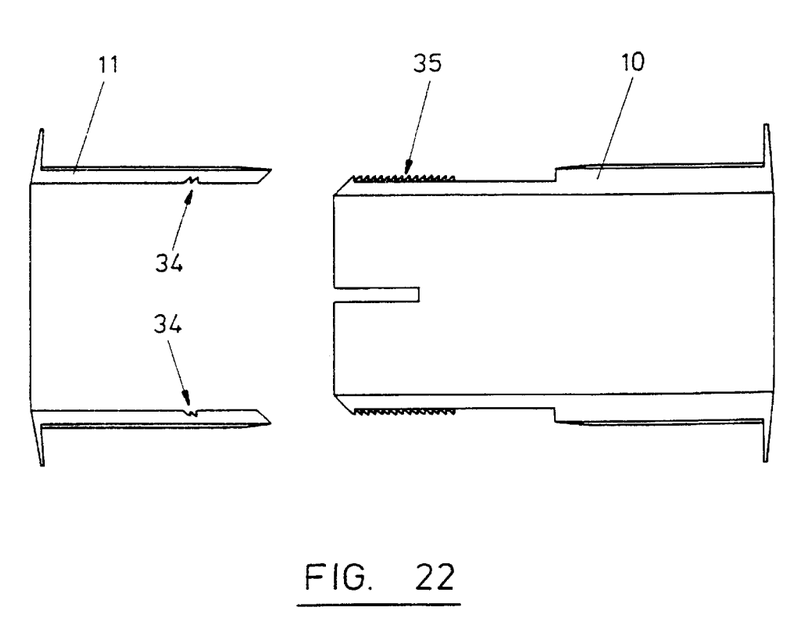

Yet another embodiment, as shown in FIG. 22, may have a groove or grooves 34 on the inside of the female member 11 and the tooth or teeth 35 on the outside of the male member 10.

Although the fastening devices according to the invention have been specifically developed to facilitate the construction of plastics pallets, the fastening devices could also be used to assist in the construction of pallets made from other materials including cardboard, steel and wood.

Although it is particularly convenient to construct the pallet as, for example, shown in FIG. 19, utilising slats, other constructions are possible, including, for example, the use of flat sheet, angle shapes, and box shapes.

The fastening devices may be used not only to fasten together the components of the pallet, but also to fasten other components to pallets and the other components might, for example, include boxes, crates and beams.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only or a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A fastening device to be inserted in a hole in an article to be fastened, the fastening device comprising a first member having a male shank and an enlarged head, a second member having a female shank and an enlarged head, the shanks being respectively insertable into the hole in the article from opposite ends of the hole, to cause the male shank to slide within the female shank such that the shanks interengage and are thus restrained against moving in the reverse direction, so that the article is held between the enlarged heads, characterized in that the male shank has a tapered radially compressible nose so that pressure can be applied to the tapered surface of the nose, the pressure applied onto the tapered nose bringing about a component of force which is directed radially inwards, thus compressing the male shank radially inwardly after the device has been fastened, to enable the two members to be separated again.

2. A fastening device as claimed in claim 1, in which the shanks are provided with ratchet means to bring about the interengagement.

3. A fastening device as claimed in claim 2, in which there are teeth on the shanks.

4. A fastening device as claimed in claim 3, in which the teeth are annular.

5. A fastening device as claimed in claim 4, in which the male shank is radially compressible inwardly to facilitate the sliding of the teeth of the male shank over the teeth of the female shank.

6. A fastening device as claimed in claim 1, in which the male shank is rendered radially inwardly compressible by forming the shank as a sleeve, the sleeve having at least one axially extending slot therein.

7. A fastening device as claimed in claim 1, in which at least one of the heads is resiliently deformable in the axial direction so that the two members can be moved towards one another to reach a position in which compressive load is applied to the article by the fastening device.

8. A fastening device as claimed in claim 7, in which the head is shaped such that at least the outer rim of the head can be flexed away from the article in the axial direction.

9. An article comprising at least two components, each having a hole there through, in combination with at least one fastening device as claimed in claim 1, the fastening device passing through the holes in the components, thus fastening the components together.

10. A pallet comprising at least two components, each having a hole therethrough in combination with at least one fastening device as claimed in claim 1, the fastening device passing through the holes in the components, thus fastening the components together.

11. A pallet as claimed in claim 10, further comprising a plurality of elongate slats, and a plurality of fastening devices that are arranged to secure the slats together.

12. A pallet as claimed in claim 10, further comprising upper and lower faces spaced apart by separaters.

13. A pallet as claimed in claim 12, in which the upper and lower faces are secured to each other and to separators by fastening devices of one size, the slats being secured to each other using fastening devices having a smaller size.

14. A fastening device as claimed in claim 1, made of plastics material.

15. A pallet as claimed in claim 10, made of plastics.

16. A pallet as claimed in claim 15, in which the upper and lower faces are secured to each other and to separators by fastening devices of one size, the slats being secured to each other using fastening devices having a smaller size.

17. A fastening device as claimed in claim 1, made of plastics material.

18. An article as claimed in claim 12, made of plastics material.

* * * * *